US008225389B2

(12) United States Patent
Lund

(10) Patent No.: US 8,225,389 B2
(45) Date of Patent: Jul. 17, 2012

(54) METHOD AND SYSTEM TO PROVIDE PHYSICAL PORT SECURITY IN A DIGITAL COMMUNICATION SYSTEM

(75) Inventor: Martin Lund, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 2090 days.

(21) Appl. No.: 10/646,976

(22) Filed: Aug. 22, 2003

(65) Prior Publication Data

US 2004/0205000 A1    Oct. 14, 2004

(51) Int. Cl.
*G06F 9/00* (2006.01)
(52) U.S. Cl. ............. 726/13; 726/2; 726/3; 726/12; 713/53; 713/163; 710/3; 710/30; 370/351; 370/390; 370/392; 709/238
(58) Field of Classification Search ............ 713/1, 2, 713/188, 194, 150, 153, 163, 170, 171; 380/200, 380/201, 255, 277, 188, 194, 45; 726/2, 726/3, 12, 13; 370/351, 390, 392; 705/21; 709/238; 710/3, 30
See application file for complete search history.

(56) References Cited

U.S. PATENT DOCUMENTS

| 4,757,529 | A | * | 7/1988 | Glapa et al. ............. 379/266.02 |
|---|---|---|---|---|
| 4,896,934 | A | * | 1/1990 | Arthurs et al. .................. 398/51 |
| 4,965,467 | A | * | 10/1990 | Bilterijst ......................... 327/91 |
| 4,991,171 | A | * | 2/1991 | Teraslinna et al. ............ 370/388 |
| 5,001,702 | A | * | 3/1991 | Teraslinna et al. ............ 370/392 |
| 5,068,892 | A | * | 11/1991 | Livanos .................... 379/112.01 |
| 5,457,478 | A | * | 10/1995 | Frank ............................. 345/158 |
| 5,555,542 | A | * | 9/1996 | Ogura et al. .................. 370/400 |
| 5,689,505 | A | * | 11/1997 | Chiussi et al. ................ 370/388 |
| 5,768,556 | A | * | 6/1998 | Canada et al. ................ 712/216 |
| 5,951,651 | A | * | 9/1999 | Lakshman et al. ............ 709/239 |
| 6,069,971 | A | * | 5/2000 | Kanno et al. .................. 382/144 |
| 6,473,431 | B1 | * | 10/2002 | Perlman et al. ............... 370/400 |
| 6,484,261 | B1 | * | 11/2002 | Wiegel ............................. 726/11 |
| 6,501,757 | B1 | * | 12/2002 | Kamaraj et al. .......... 370/395.41 |
| 6,507,877 | B1 | * | 1/2003 | Ross ............................... 710/53 |
| 6,658,002 | B1 | * | 12/2003 | Ross et al. ..................... 370/392 |
| 6,771,673 | B1 | * | 8/2004 | Baum et al. ................... 370/535 |
| 6,792,518 | B2 | * | 9/2004 | Armangau et al. ........... 711/162 |
| 6,862,279 | B1 | * | 3/2005 | Imai et al. ..................... 370/390 |
| 6,961,725 | B2 | * | 11/2005 | Yuan et al. .................... 707/694 |
| 7,043,467 | B1 | * | 5/2006 | Milito et al. .................... 706/45 |
| 7,076,568 | B2 | * | 7/2006 | Philbrick et al. ............. 709/250 |
| 7,095,741 | B1 | * | 8/2006 | Joshi et al. .................... 370/392 |
| 7,136,381 | B2 | * | 11/2006 | Battle et al. ................... 370/389 |
| 7,143,132 | B2 | * | 11/2006 | Klein et al. ................... 709/203 |
| 7,151,777 | B2 | * | 12/2006 | Sawey ........................... 370/413 |
| 7,193,997 | B2 | * | 3/2007 | Van Lunteren et al. ....... 370/392 |
| 7,274,694 | B1 | * | 9/2007 | Cheng et al. .................. 370/389 |

(Continued)

*Primary Examiner* — Aravind Moorthy
*Assistant Examiner* — Joseph Pan
(74) *Attorney, Agent, or Firm* — Thomas, Kayden, Horstemeyer & Risley, LLP

(57) ABSTRACT

A method and system of providing physical port security in a digital data network is disclosed. The system keeps bit maps of allowed physical output ports for each physical network connection. The map of allowed ports can be different for different source addresses connected to the device. When digital data, such as an IP packet, is received, the appropriate physical port security bit map is retrieved and a logical AND is done on the physical port bit map generated by the destination information. The resulting bit map is used to determine which physical ports the data is routed to, blocking any requested destinations that are not appropriate destinations based on the port security bit map.

25 Claims, 3 Drawing Sheets

U.S. PATENT DOCUMENTS

| | | | |
|---|---|---|---|
| 7,881,296 B2 * | 2/2011 | Joshi et al. | 370/392 |
| 2002/0145995 A1 * | 10/2002 | Uriu et al. | 370/351 |
| 2003/0043938 A1 * | 3/2003 | Masejnik et al. | 375/340 |
| 2003/0128688 A1 * | 7/2003 | Kim | 370/351 |
| 2004/0032869 A1 * | 2/2004 | Ambe et al. | 370/392 |
| 2004/0066781 A1 * | 4/2004 | Shankar et al. | 370/389 |

* cited by examiner

METHOD AND SYSTEM TO PROVIDE PHYSICAL PORT SECURITY IN A DIGITAL COMMUNICATION SYSTEM

CROSS-REFERENCE TO RELATED APPLICATIONS/INCORPORATION BY REFERENCE

This application makes reference to, claims priority to, and claims the benefit of: U.S. Provisional Application Ser. No. 60/462,172 filed Apr. 11, 2003. The above application is incorporated herein by reference in its entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Traditional networking and switching environments rely on destination addresses within frames or packets to determine where the frame or packet is to be forwarded. The destination addresses may be IP (Internet Protocol) addresses or MAC (media access control) addresses, for example.

Security is often provided by maintaining a list of allowed addresses to which frames may be forwarded. A frame of data, having a destination address that is not on the list of allowed addresses, received by a device (e.g., a router) on a digital communication network can be dropped (i.e., not forwarded). However, users of a communication network can assume identities and apply methods to counter such address-based security techniques.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in a method of providing physical port security including the steps of receiving digital data, inspecting the IP address of the data, generating a destination port bit map of requested physical ports based on the destination information contained in the data, and logically ANDing the generated map with a bit map of the allowed physical destination ports. A further aspect of the method utilizes the source address information in the received data to generate the bit map of allowed physical destinations. An exemplary system of the invention implements physical port security on any intermediate network device, such as a router, for example. The intermediate device contains a bit map of allowed physical destinations that is logically ANDed with the bit map or truth table of requested destinations to create a table of allowed destination ports. Data is only forwarded to ports that are marked as requested AND allowed by the bit map. The bit map of allowed ports may be static or dynamic. For example, the bit map of allowed ports may be generated based on the time of day.

These and other advantages, aspects and novel features of the present invention, as well as details of an illustrated embodiment thereof, will be more fully understood from the following description and drawings.

DETAILED DESCRIPTION OF THE INVENTION

Certain embodiments of the present invention relate to security on a digital communication network. In particular, certain embodiments of the present invention relate to providing security on a digital communication system at the physical port level.

Figure 1:
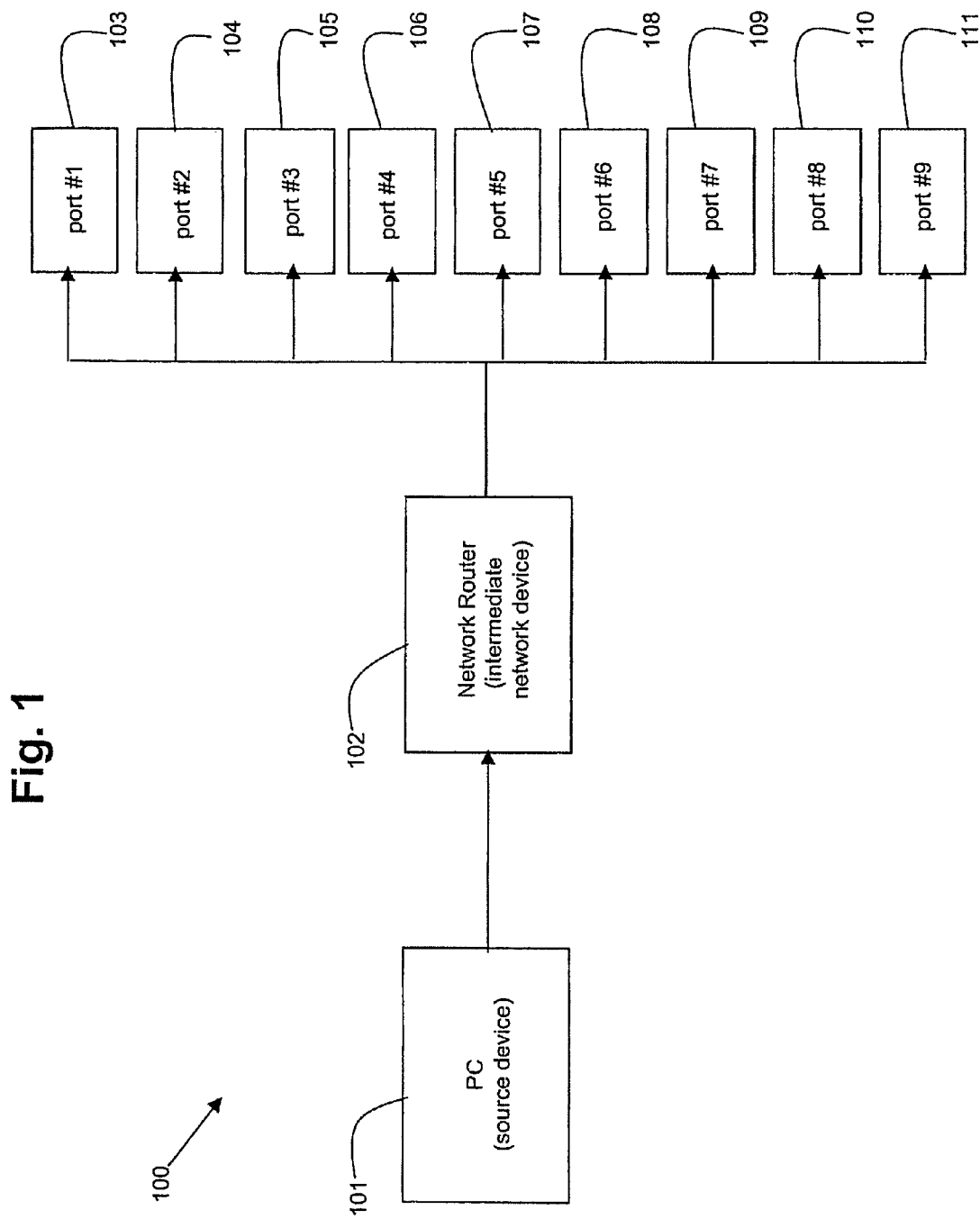
FIG. 1. is a diagram illustrating an embodiment of a digital communication system providing physical port security, in accordance with various aspects of the present invention.

FIG. 1. is a diagram illustrating an embodiment of a digital communication system 100 providing physical port security, in accordance with various aspects of the present invention. The digital communication system 100 comprises a source device (e.g., a PC) 101, an intermediate network device (e.g., a network router) 102, and nine physical ports, port #1 103 to port #9 111. The source device 101 interfaces to the intermediate network device 102. The intermediate network device 102 interfaces to the physical ports 103-111.

At the physical and datalink layers of a network communication protocol (e.g., the TCP/IP protocol), bits of information are fit into units called data frames. The data frames include source and destination information. Data frames may be classified according to their source and destination ports.

All nodes (clients, servers, routers, etc.) in a network (e.g., a TCP/IP-based network) are assigned an IP address that is written as four numbers between dots, such as 187.5.65.01. The first part of the address is the network address and the second part is the end station address. The network part of the address allows data frames to be routed to a different network. IP addresses are turned into physical station addresses (i.e., MAC addresses) on a network. A data frame is prefixed with an IP header that contains source and destination IP addresses for that data frame.

Network routers contain routing tables that move data frames to the next destination which is either the destination network or another router. In one embodiment, routers inspect only the network part of an address and direct the incoming data frames to the appropriate port for the next "hop" of the routing. Routers move data frames from one hop to the next since a router typically is only aware of devices that are directly connected to the router. A feature called "multicast" allows a data frame to be delivered to multiple destinations in a digital communication network.

In general, a port in a communication network is a physical point at which signals may enter or leave the network in route to or from another network. Router ports are physical pathways to and from a router connected via a cable.

The nine physical ports 103-111 in FIG. 1 correspond to other devices on the digital communication system 100 which may comprise end stations, other network routers, network bridges, etc. In accordance with an embodiment of the present invention, the source device 101 sends a data frame to the intermediate network device 102. The intermediate network device 102 then sends the data frame to any or all of the physical ports 103-111 based on the destination addresses contained within the data frame and based on the physical port security defined within the intermediate network device 102.

Figure 2:
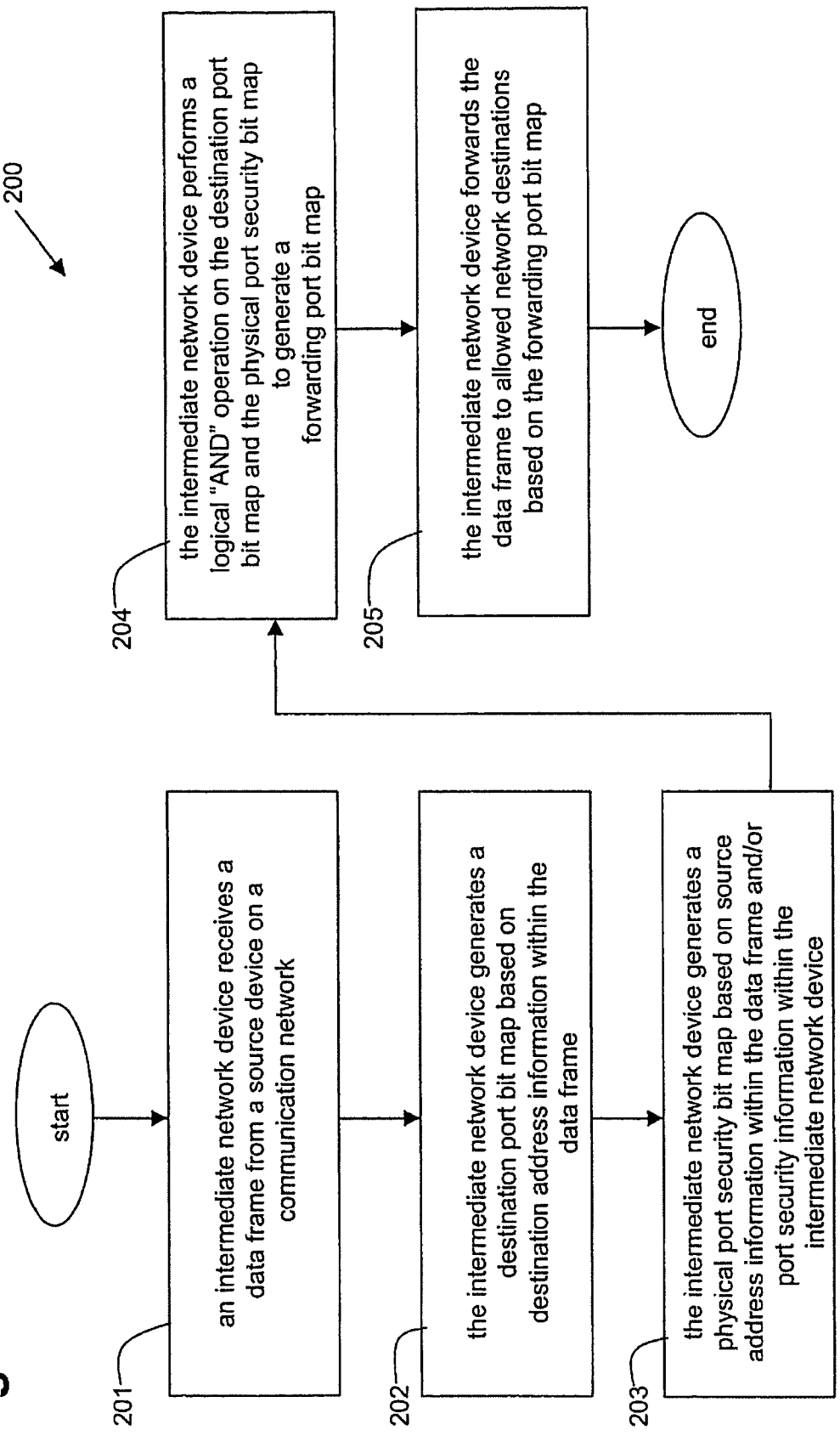
FIG. 2 is a flowchart illustrating an embodiment of a method to provide physical port security in the digital communication system of FIG. 1, in accordance with various aspects of the present invention.

FIG. 2 is a flowchart illustrating an embodiment of a method 200 to provide physical port security in the digital communication system 100 of FIG. 1, in accordance with various aspects of the present invention. In step 201, an intermediate network device receives a data frame from a source device on a communication network. In step 202, the intermediate network device generates a destination port bit map based on destination address information within the received data frame. In step 203, the intermediate network device generates a physical port security bit map based on source address information within the data frame and/or based on port security information within the intermediate network device. In step 204, the intermediate network device performs a logical "AND" operation on the destination port bit map and the physical port security bit map to generate a forwarding port bit map. In step 205, the intermediate network device forwards the data frame to allowed network destinations based on the forwarding port bit map.

Figure 3:
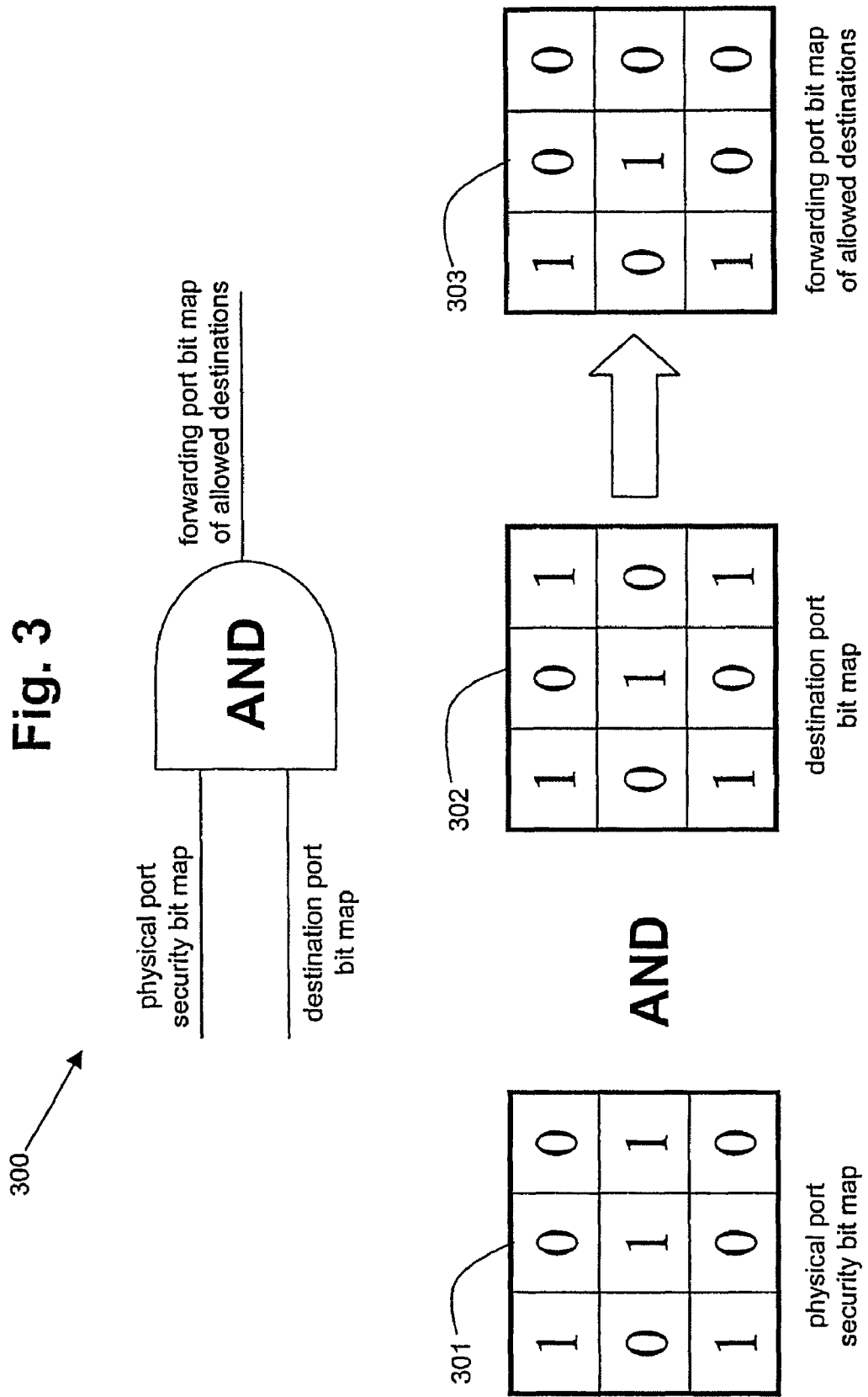
FIG. 3 is a diagram illustrating an embodiment of part of the method of FIG. 2 for performing a logical "AND" operation on two bit maps, in accordance with various aspects of the present invention.

FIG. 3 is a diagram illustrating an embodiment of part of the method 200 of FIG. 2 for performing a logical "AND" operation 300 on two bit maps, in accordance with various aspects of the present invention. A physical port security bit map 301 and a destination port bit map 302 are input to the logical "AND" operation 300. The result is a forwarding port bit map 303 of allowed destinations.

In accordance with an embodiment of the present invention, a bit map essentially comprises a table of "1's" and "0's". A "1" indicates an allowed port and a "0" indicates a disallowed or undesired port. As an example, referring to FIG. 1 and FIG. 3, the physical port security bit map 301 comprises a table of four "1's" and five "0's" corresponding to a total of nine physical ports that the network router 102 is connected to. The four "1's" identify four physical ports (e.g., port #1, port #5, port #6, and port #7) on the network that the network router 102 is allowed to forward frames of data to. The five "0's" identify five physical ports (e.g., port #2, port #3, port #4, port #8, and port #9) on the network that the router is not allowed to forward frames of data to, for security reasons.

In accordance with various embodiments of the present invention, the router 102 may generate a physical port security bit map based on several criteria. For example, the router may keep a pre-defined list of ports it is allowed to communicate with. Also, the router may keep a pre-defined list of source addresses and associated ports, for a given source address, it is allowed to forward data frames to. Therefore, a resultant physical port security bit map may be based on pre-defined security rules for the router and/or pre-defined security rules for a given source. The physical port security bit map may also be defined dynamically. For example, the bit map may be altered or applied based on the time of day, amount of network traffic, or some other variable parameter such as source or destination port utilization or port error rates. Alternatively, the static port security map may be periodically ANDed with the dynamic map to generate the current port security bit map.

When the PC 101 sends a data frame to the network router 102, the network router 102 generates a destination port bit map 302. The destination port bit map 302 is a translation of destination addresses to physical ports. The addresses may be physical MAC addresses of network end stations and bridge ports, or logical ID's. A filtering database within the network router 102 includes addresses associated with each port. The forwarding process of the network router 102 compares the destination address(es) of the received frame to the addresses in the filtering database to generate the destination port bit map 302.

The destination port bit map 302, in the present example, comprises five "1's" and four "0's" corresponding to the same nine physical ports (103-111) on the network. The five "1's" identify five physical ports (e.g., port #1, port #3, port #5, port #7, and port #9) that the data frame would like to be forwarded to based on the destination addresses encoded within the data frame.

The logical "AND" operation 300 performed by the network router 102 results in the forwarding port bit map 303 comprising three "1's" and six "0's". As a result, the router 102 will forward the data frame to three of the five port destinations desired by the data frame (i.e., the three port destinations identified by the three "1's" in the forwarding port bit map 303; port #1, port #5, and port #7). Two ports (port #3 and port #9) of the five ports (port #1, port #3, port #5, port #7, and port #9) have been blocked from receiving the data frame for security reasons (i.e., the network router 102 will not forward the data frame to port #3 and port #9 even though the destination addresses in the data frame indicate that the data frame should be forwarded to port #3 and port #9 as well).

In accordance with an alternative embodiment of the present invention, a source device (e.g., PC 101) may perform physical port security for data frames generated within the source device. The source device may generate a physical port security bit map and a destination port security bit map and perform the logical "AND" operation to generate a forwarding port bit map. In general, any device on a digital communication network may perform physical port security, in accordance with various embodiments of the present invention.

In accordance with other alternative embodiments of the present invention, other digital communication system configurations, different from that of FIG. 1, may be implemented as well, also performing physical port security.

In summary, a method and system provide physical port security on a digital communication system. For a given device in the system, security rules may be defined based on associated forwarding ports and/or source devices. Bit mapping techniques and logical operations may be employed to determine which ports a given data frame from a given source is allowed to be forwarded to.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of providing physical port security in a digital communication system, comprising:
   receiving a frame of digital data at a network device;

generating a destination port bit map based on the destination address information contained in said frame of digital data;

generating a physical port security bit map of allowed destination ports, wherein said physical port security bit map is generated based at least in part on information in said received frame of digital data;

comparing, using at least one logical operation, said destination port bit map with said physical port security bit map to generate a bit map of allowed destination ports; and forwarding said frame of digital data to one or more of said allowed destination ports.

2. The method of claim 1, wherein said comparing comprises conducting a logical AND on said destination port bit map and physical port security bit map.

3. The method of claim 1, comprising generating said physical port security bit map using source address information contained in said digital data frame.

4. The method of claim 1, comprising generating said physical port security bit map using destination address information contained in said digital data frame.

5. The method of claim 1, comprising generating said physical port security bit map using a combination of source and destination address information contained in said digital data frame.

6. The method of claim 1, wherein said address information comprises IP address information.

7. The method of claim 1, wherein said frame of digital data is received by a router.

8. The method of claim 1, wherein said frame of digital data is received by a network file server.

9. The method of claim 1, wherein said network device comprises one or more physical ports connected to a local area network.

10. The method of claim 1, wherein said received frame of digital data is received from a process that is inside of said network device.

11. The method of claim 1, wherein said physical port security bit map is generated dynamically based on a variable parameter.

12. A system for providing physical port security, comprising:

at least one processor within a network device, said network device having a communications port for receiving digital data from a digital communications system and two or more physical data ports for forwarding said digital data, said at least one processor being configured to:

generate a destination port bit map based on destination address information contained in said received digital data;

generate a physical port security bit map of allowed destination ports, wherein said physical port security bit map is generated based at least in part on information in said received frame of digital data;

compare, using at least one logical operation, said destination port bit map with said physical port security bit map to generate a bit map of allowed destination ports; and forward said digital data to one or more of said allowed destination ports.

13. The system of claim 12, wherein said at least one processor is configured to conduct a logical AND operation on said destination port bit map and said physical port security bit map.

14. The system of claim 12, wherein said physical port security bit map is generated using source address information contained in said digital data.

15. The system of claim 12, wherein said physical port security bit map is generated using destination address information contained in said digital data.

16. The system of claim 12, wherein said physical port security bit map is generated from a table of stored allowed physical port addresses that varies depending on a combination of source and destination address information contained in said digital data.

17. The system of claim 12, wherein said address information comprises IP address information.

18. The system of claim 12, wherein said network device comprises a router.

19. The system of claim 12, wherein said network device comprises a network file server.

20. The system of claim 12, wherein said two or more physical data ports of said network device are connected to a local area network.

21. The system of claim 12, wherein said digital data comprises IP data.

22. The system of claim 12, wherein said at least one processor is configured to retrieve said physical port security bit map based on an IP source address contained in said digital data.

23. The system of claim 12, wherein said network device is the source of said received digital data.

24. The system of claim 12, wherein said physical port security bit map is dynamically altered based on a variable parameter.

25. A system for providing physical port security, comprising:

means for receiving a frame of digital data at a network device;

means for generating a destination port bit map based on the destination address information contained in said frame of digital data;

means for generating a physical port security bit map of allowed destination ports, wherein said physical port security bit map is generated based at least in part on information in said received frame of digital data;

means for comparing, using at least one logical operation, said destination port bit map with said physical port security bit map to generate a bit map of allowed destination ports; and means for forwarding said frame of digital data to one or more of said allowed destination ports.

* * * * *